United States Patent [19]

Gregerson et al.

[11] Patent Number: 4,887,954

[45] Date of Patent: Dec. 19, 1989

[54] VEHICLE RESTRAINT

[75] Inventors: Glen M. Gregerson, Janesville; John T. Lunenschloss; Henry M. Ebbott, both of Madison; Raymond A. Beckeman, McFarland, all of Wis.

[73] Assignee: Air-Lec Industries, Inc., Madison, Wis.

[21] Appl. No.: 321,185

[22] Filed: Mar. 9, 1989

[51] Int. Cl.$^4$ .............................................. B65G 69/00
[52] U.S. Cl. .................................. 414/401; 294/82.33; 414/396
[58] Field of Search ...................... 414/396, 401, 586; 294/82.31, 82.34; 114/252, 253

[56] References Cited

U.S. PATENT DOCUMENTS

| | | | |
|---|---|---|---|
| 1,477,836 | 12/1923 | McGowan | 294/82.34 |
| 1,900,227 | 3/1933 | Craig | 294/82.33 |
| 2,014,963 | 9/1935 | Coder | 294/82.34 |
| 3,244,415 | 4/1966 | Lunenschloss et al. | 268/50 |
| 3,291,003 | 12/1966 | Lunenshloss et al. | 268/50 |
| 4,127,856 | 11/1978 | Bickel | 340/687 |
| 4,264,259 | 4/1981 | Hipp | 414/401 |
| 4,282,621 | 8/1981 | Anthony et al. | 14/71.1 |
| 4,373,847 | 2/1983 | Hipp et al. | 414/401 |
| 4,379,354 | 4/1983 | Hahn et al. | 14/71.3 |
| 4,400,127 | 8/1983 | Metz | 414/401 |
| 4,443,150 | 4/1984 | Hahn et al. | 414/401 |
| 4,472,099 | 9/1984 | Hahn et al. | 414/401 |
| 4,488,325 | 12/1984 | Bennett et al. | 14/71.3 |
| 4,553,895 | 11/1985 | Ellis | 414/401 |
| 4,555,211 | 11/1985 | Metz | 414/401 |
| 4,560,315 | 12/1985 | Hahn | 414/401 |
| 4,589,813 | 5/1986 | Hagen et al. | 414/401 |
| 4,605,353 | 8/1986 | Hahn et al. | 414/401 |
| 4,630,989 | 12/1986 | Davey | 414/401 |
| 4,634,334 | 1/1987 | Hahn et al. | 414/401 |
| 4,648,781 | 3/1987 | Sikora | 414/401 |
| 4,664,582 | 5/1987 | Edmeads | 414/401 |
| 4,674,941 | 1/1987 | Hageman | 414/401 |
| 4,692,755 | 9/1987 | Hahn | 340/687 |
| 4,695,216 | 9/1987 | Erlandsson | 414/401 |
| 4,728,242 | 3/1988 | Erlandsson | 414/401 |
| 4,735,542 | 4/1988 | Fisher et al. | 414/401 |
| 4,759,678 | 7/1988 | Hageman | 414/401 |

OTHER PUBLICATIONS

Rite-Hite Corp. advertisement entitled "Don't Fall for Anything Less Than Safety-Proven Dok-Lok Trailer Restraints."
Rite-Hite Corp. advertisement entitled "Rite-Hite Manual Dok-Lok Vehicle Restraint".
Rite-Hite Corp. advertising brochure entitled "Rite-Hite Hydraulic Dok-Lok-Levelers."
Kelley Company, Inc. advertisement entitled "Which Dock Equipment is a Sure Success with a Major Building Products Supplier?".
Kelley Company, Inc. advertisement entitled "Why is Truk Stop More Reliable?".
Systems, Inc. "Powerhook" advertisement.
Serco Engineering Corp. advertising brochure.
Serco Engineering Corp. advertisement entitled "For Security Safety and Efficiency on the Loading Dock, call the Professionals."

Primary Examiner—Sherman D. Basinger
Assistant Examiner—Edwin L. Swinehart
Attorney, Agent, or Firm—Lathrop & Clark

[57] ABSTRACT

A vehicle restraint for releasably locking a vehicle to an adjacent structure includes a frame which can be mounted adjacent to the structure, a sector assembly which is mounted within the frame to rotate about a substantially horizontal axis in a first rotational direction to a restraint position in which the vehicle is locked to the adjacent structure and in an opposite second rotational direction to a release position in which the vehicle is released, an actuator which is connected to the frame and sector assembly to rotate the sector assembly in its first rotational direction into the restraint position, and at least one movable impediment biased to move to lock the sector assembly in its restraint position until released.

12 Claims, 4 Drawing Sheets

VEHICLE RESTRAINT

BACKGROUND OF THE INVENTION

1. Field of the Invention

The present invention relates to devices which are used for securing a vehicle in parked position next to a loading dock or platform.

2. Description of the Related Art

A large number of devices have been developed or engaging the ICC bar of the vehicles which are parked next to loading docks or platforms Many of these devices have a restraining member which rotates between locked and unlocked positions. For example, U.S. Pat. No. 4,630,989 to Davey discloses a bar which is rotated between the horizontal and vertical positions by a hydraulic cylinder. A system with a hook member which is rotated by a motor between locked and unlocked positions, and which includes a slip clutch between the drive motor and hook member is disclosed in U.S. Pat. No. 4,692,755 to Hahn. In U.S. Pat. No. 4,634,334 to Hahn, et al., the motor-driven rotatable locking unit rotates about an axis perpendicular to the loading dock so that the locking unit swings in a plane parallel to the loading dock between a position which traps the ICC bar between the locking unit and the loading dock, and a position which allows the ICC bar to move away from the dock. An adjustably mounted toe-like member which extends downwardly to the roadway is disclosed in U.S. Pat. No. 4,560,315 to Hahn. The device includes a rotating hook which is rotated on a sliding carriage which moves up and down for height adjustment. U.S. Pat. No. 4,472,099 to Hahn, et al. discloses a hydraulically operated rotating hook with a manually operated pump for activating the hook. A rotating locking hook which is driven through a clutch-like apparatus by an electric motor is shown in U.S. Pat. No. 4,282,621 to Anthony, et al. U.S. Pat. No. 4,648,781 to Sikora shows a rotating locking hook which is electric motor-chain driven. In most of these devices, the restraining structure is usually either a rotating or pivoting hook or bar.

SUMMARY OF THE INVENTION

The present invention is summarized in that a vehicle restraint for releasably locking a vehicle to an adjacent structure includes a frame which can be mounted adjacent to the structure, a sector assembly which is mounted within the frame to rotate about a substantially horizontal axis in a first rotational direction to a restraint position and in an opposite second rotational direction to a release position, at least one movable impediment which is able to prevent rotation of the sector assembly in the second rotational direction from its restraint position to its release position until the impediment is selectively removed, and an actuator which is connected to the frame and sector assembly to rotate the sector assembly in the first rotational direction into the restraint position. The actuator preferably is a pneumatic single acting cylinder with a piston which is connected to the sector assembly.

The sector assembly includes at least one sector plate which rotates in a substantially vertical plane as the sector assembly rotates. Each sector plate includes a restraint sector portion with a restraint surface formed by a radial-like sector margin facing in the first rotational direction and which extends substantially upwardly above the frame when the sector assembly is in its restraint position to define a confining area behind the restraint surface, and which allows forward access to the confining area when the sector assembly is in its release position. Each sector plate further includes a locking sector portion with a locking surface formed by a radial-like sector margin facing in the second rotational direction.

The movable impediment preferably is formed by at least one shotpin which is biased to slide to intersect the vertical plane which is formed by the rotating sector plate to thereby lock the sector assembly in its restraint position. When the sector assembly is in the restraint position and the shotpins slide outwardly, then each shotpin adjacently overlies the locking surface of the corresponding sector plate to prevent rotation of the sector assembly in the second rotational direction. The shotpins preferably are biased by a spring which is connected to the far end of a rotating lever which is connected to each shotpin by means of a linkage.

In the vehicle restraint, the sector assembly is the member which is rotated to restrain vehicles. The sector assembly is a component which is significant in size when compared to the entire vehicle restraint. Each of the sector plates lie substantially in the two dimensions which are vertical and perpendicular to the axis of rotation. It is significant that it is in these two dimensions that the major forces act upon the sector assembly. Since in these dimensions the sector plates are quite thick, the sector assembly is able to withstand these forces quite effectively.

The primary object of the invention is to provide a vehicle restraint in which the component which restrains the vehicle is relatively large compared to the entire vehicle restraint.

Another object of the present invention is to provide a vehicle restraint in which the restraining component, or sector assembly, is so dimensioned that it is quite thick in the directions in which it resists forces.

An additional object of the present invention is to provide a vehicle restraint in which the restraining component, or sector assembly, is formed primarily from steel plates.

Other objects, features, and advantages of the invention will be apparent from the following detailed description taken in conjunction with the accompanying drawings wherein a preferred embodiment of the invention has been selected for exemplification.

DESCRIPTION OF THE PREFERRED EMBODIMENT

Figure 1:
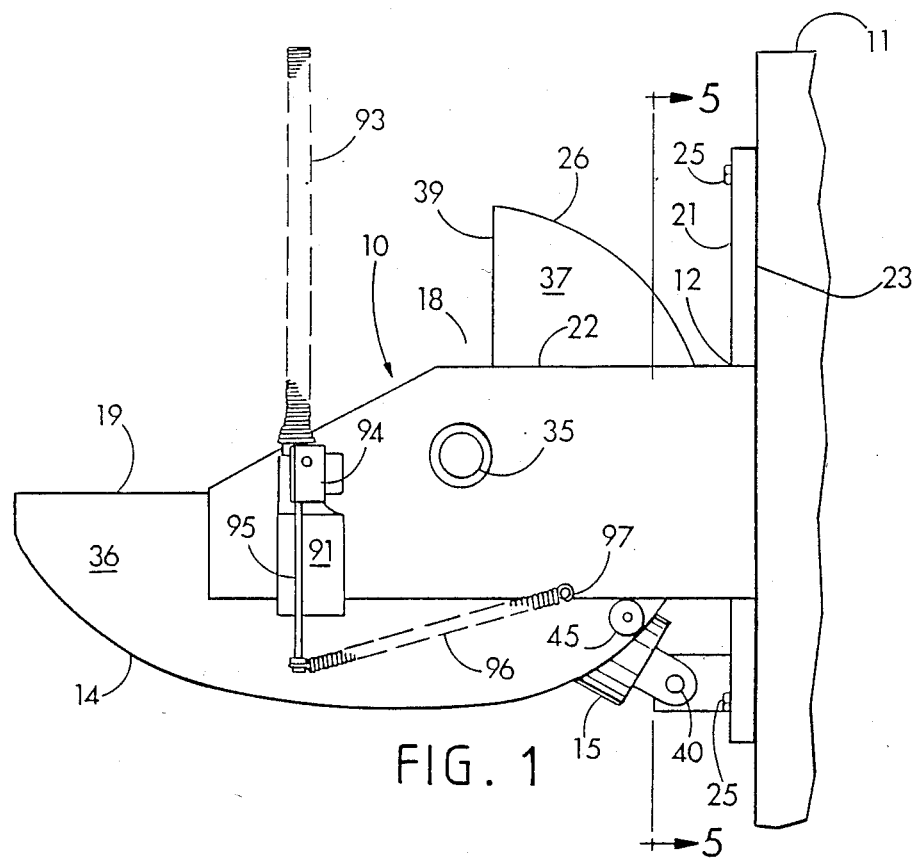
FIG. 1 is a right side elevational view of the preferred vehicle restraint, with the sector assembly in the release position, in accordance with the invention.

Referring more particularly to the drawings, wherein like numbers refer to like parts, FIG. 1 shows a preferred vehicle restraint 10 which is used for releasably locking vehicles such as trucks with ICC bars to adjacent structures such as a concrete dock 11. The vehicle restraint 10 includes a frame 12, a sector assembly 14 and an actuator 15 which rotates the sector assembly 14 to the restraint position shown in FIGS. 2–4. When the sector assembly 14 is in its restraint position, the ICC bar 17 is held within a confining area 18 to the rear, or dockward side, of restraint surfaces 19.

The frame 12 includes a backplate 21 which is mounted to the concrete dock 11, and two sideplates 22 which extend forwardly from the side margins 23 of the backplate 21. The backplate 21 may be bolted as shown at 25 to the dock 11 or otherwise securely attached thereto, and the backplate 21 and two sideplates 22 may be bolted, welded, or otherwise securely connected together to form the frame 12.

Figure 2:
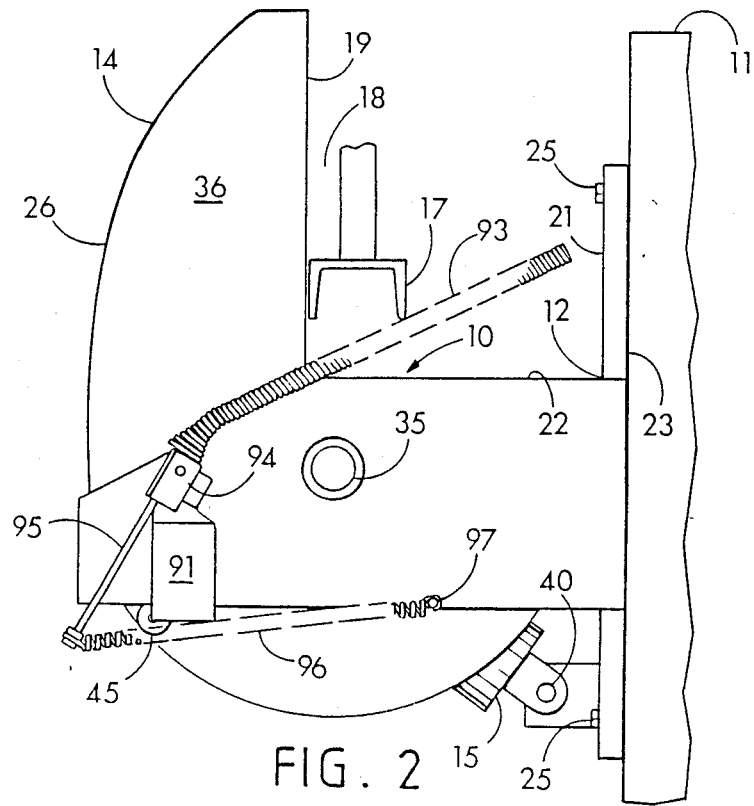
FIG. 2 is a right side elevational view of the preferred vehicle restraint of FIG. 1, with the sector assembly in its restraint position.
Figure 3:
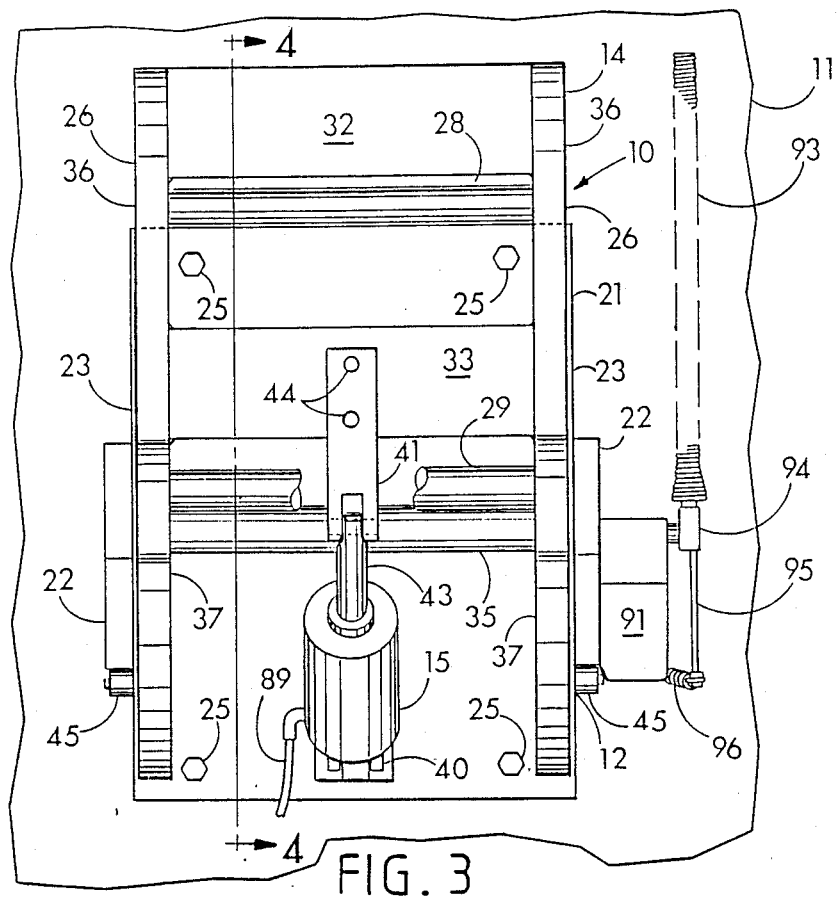
FIG. 3 is a front elevational view of the preferred vehicle restraint with the sector assembly in its restraint position, and a crossbar broken away to show the bracket to which the actuator is connected.
Figure 4:
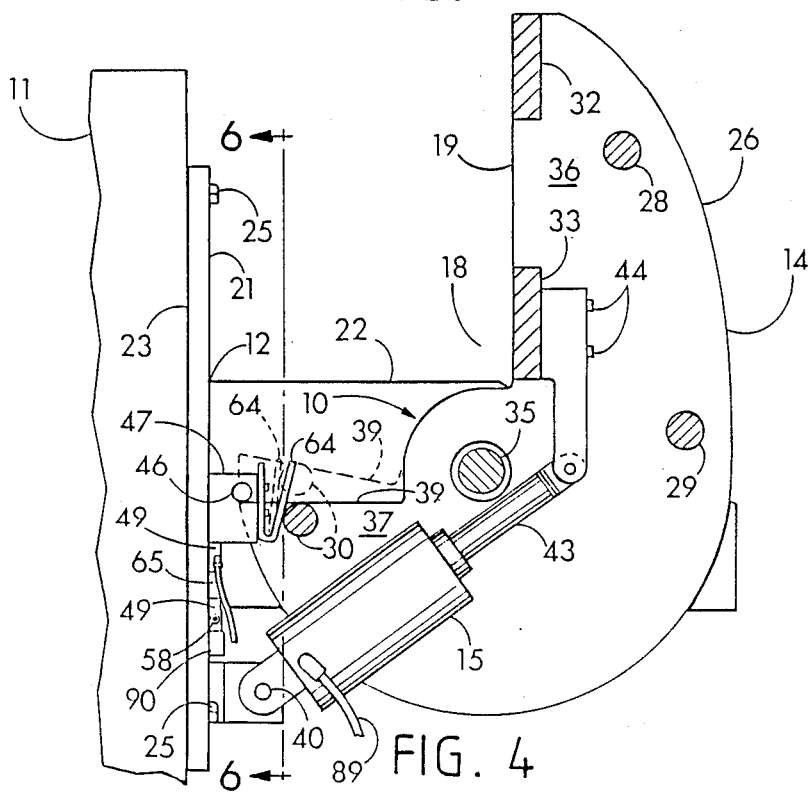
FIG. 4 is a cross-sectional view of the vehicle restraint taken along section line 4—4 of FIG. 3.

As shown in FIGS. 3–4, the sector assembly 14 is rotatably mounted between the sideplates 22 by means of the horizontal axle 35 which allows each of two sector plates 26 to rotate in substantially vertical planes which are adjacent and parallel to the sideplates 22. The sector assembly 14 rotates in a first rotational direction to its restraint position shown in FIG. 2, and in an opposite second rotational direction to its release position shown in FIG. 1. It is in the restraint position that the vehicle restraint 10 secures a vehicle by its ICC bar 17 to the dock 11. The sector assembly 14 includes two sector plates 26, and cross-members including three crossbars 28, 29, and 30, and two crossplates 32 and 33, which cross members all extend between the two sector plates 26. The crossbars 28, 29, and 30 and the crossplates 32 and 33 extend between the two sector plates 26 in substantially parallel relation to the axle 35, and preferably are welded to the sector plates 26 in fixed rigid relation. Each sector plate 26 is formed substantially of a ¾, or 270°, sector of an oval metal plate. Alternatively, the sector plate could be formed of another sector fraction of an oval, such as ½ of an oval. Additionally, each sector plate 26 could be formed as a sector fraction of a circle, square, rectangle or other similar shapes. It has been found, however, that the elongated shape of the oval is preferable because the shape most efficiently allows the restraint surfaces 19 to be fairly long to accommodate ICC bars of various heights.

Each sector plate 26 includes a restraint sector portion 36 which extends substantially upwardly above the frame 12 when the sector assembly 14 is in its restraint position as shown in FIG. 2. Each restraint sector portion 36 includes the restraint surface 19 which is formed by a radial-like sector margin which faces in the first rotational direction. The term "radial-like" is used herein for at least three reasons. First, the sector plates 26 are not necessarily circular. Second, the restraint surfaces 19 will not necessarily extend all the way to the center of the sector plates 26. Third, the restraint surfaces 19 could be offset from intersecting the axis formed by the axle 35.

When the sector assembly 14 is in its restraint position shown in FIG. 2, the restraint surfaces 19 define the confining area 18 in which the ICC bar 17 of a vehicle is to be confined. When the sector assembly 14 is in its release position shown in FIG. 1, the restraint sector portion 36 extends forwardly to allow an ICC bar 17 forward access to and forward egress from the confining area 18. Each sector plate 26 also includes a locking sector portion 37 with a locking surface 39 formed by another radial-like sector margin which faces in the second rotational direction.

The actuator 15 is connected between the backplate 21 at 40 and the sector assembly 14 at 41. The actuator connections at 40 and 41 should be pivotal so that the actuator 15 can move through a vertical plane as it rotates the sector assembly 14. As shown in FIGS. 3–4, the actuator 15 preferably is a single action pneumatic cylinder having a piston (not shown) connected to a piston rod 43 which is pivotally connected to the bracket 41 which is positioned and bolted to the center of the crossplate 33 with the bolts 44. As the piston rod 43 extends out from the actuator 15, the sector assembly 14 rotates in the first direction to its restraint position. Alternatively, the actuator 15 might be a hydraulic cylinder or some other mechanical device capable of rotating the sector assembly 14 up to its restraint position. Included on the outside of each sector plate 26 is a stop 45 which is positioned to prevent the sector assembly 14 from rotating too far in either extreme rotational direction. The stops 45 therefore prevent damage to the actuator 15 by not allowing the actuator 15 to become too extended or too compressed.

Figure 5:
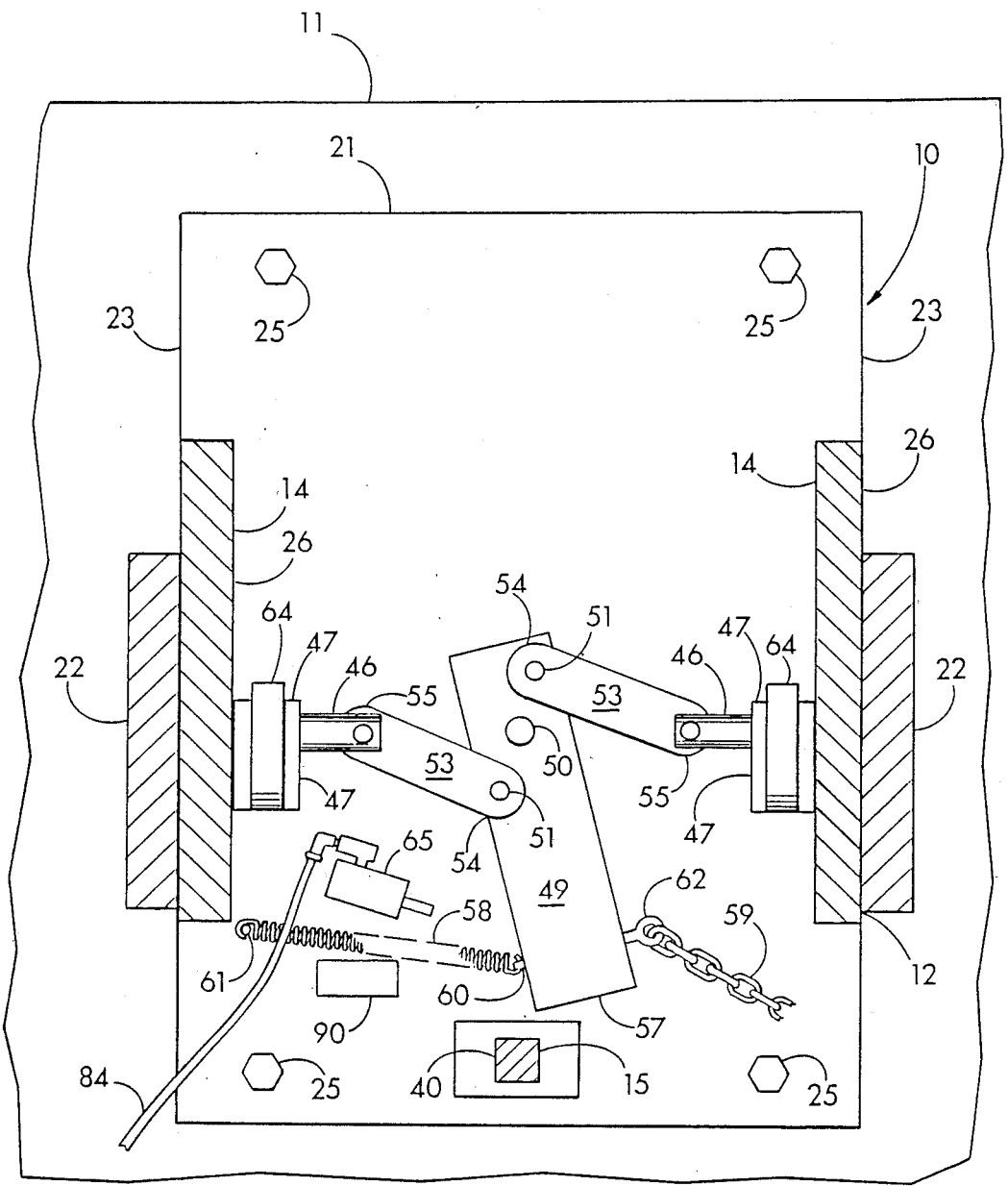
FIG. 5 is a cross-sectional view of the vehicle restraint taken along section line 5—5 of FIG. 1.
Figure 6:
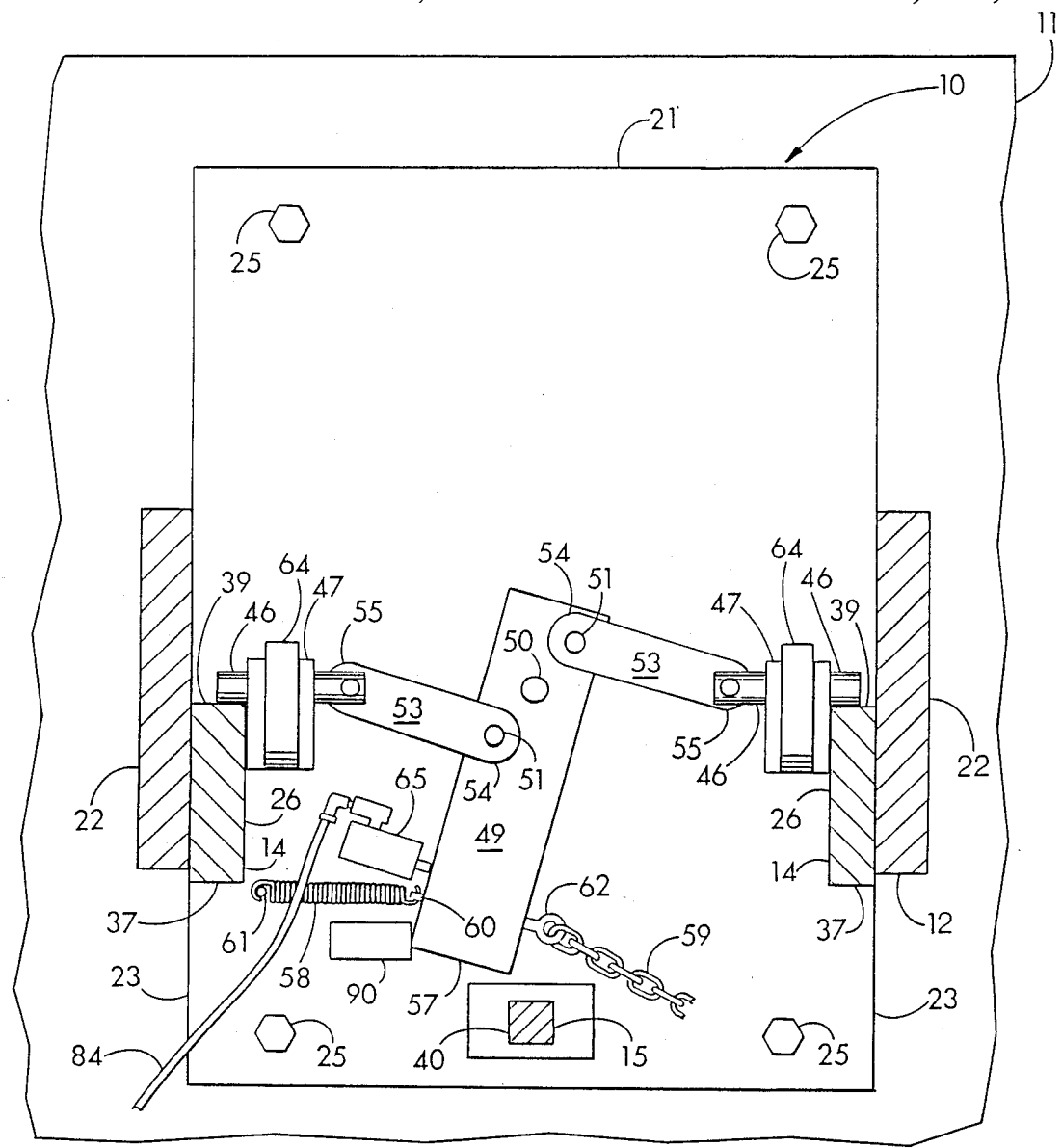
FIG. 6 is a cross-sectional view of the vehicle restraint taken along section line 6—6 of FIG. 4.

As shown in FIGS. 5 and 6, the preferred vehicle restraint 10 further includes two shotpins 46 which are each horizontally slidable through shotpin housings 47 which are affixed to the backplate 21 of the frame 12. Each shotpin 46 acts as a movable impediment which is biased to move to intersect the vertical plane in which the adjacent sector plate 26 rotates. Each shotpin 46 is mounted within its shotpin housing 47 such that when the sector assembly 14 is in its restraint position as shown in FIGS. 2, 4, and 6, the shotpin 46 moves to intersect the vertical plane adjacent to and slightly in the second rotational direction from the locking surface 39, thereby preventing rotation of the sector assembly 14 in the second rotational direction until the shotpins 46 are moved away from the vertical planes. When extended, the shotpins 46 abut or nearly abut against the locking surface 39 of the sector plate locking sector portion 37, thereby preventing rotation of the sector assembly 14 back to its release position until the shotpins 46 are retracted. As shown in FIGS. 4–6, the shotpin housings 47 are mounted to the back plate 21 at about the same elevation as the axle 35, just inside where each sector plate 26 passes.

The components which are used for moving the shotpins 46 are described as follows. The vehicle restraint 10 includes a lever 49 which is pivotally connected to the backplate 21 at the pivot point 50. FIG. 5 shows the lever 49 in its releasing position wherein the shotpins 46 are retracted away from the sector plates 26, and FIG. 6 shows the lever 49 pivoted to its locking position wherein the shotpins 46 intersect the vertical planes of the sector plates 26 near their locking surfaces 39 to prevent the sector assembly 14 from rotating to its release position. Located on the lever 49 near the pivot point 50 are two pin connecting points 51 which each move toward their respective shotpin housings 47 in a generally horizontal direction when the lever 49 pivots toward its locking position, and which move away from their respective shotpin housings 47 in a generally horizontal direction when the lever 49 pivots toward its releasing position. A linkage 53 is pivotally connected by its first end 54 to each pin connecting point 51 on the lever 49. A second end 55 of each linkage 53 is connected pivotally to the adjacent end of the corresponding shotpin 46.

Thus the lever 49 is used to convert translational motion at a far end 57 of the lever 49 into rotational motion about the pivot point 50, which in turn is transformed into translational motion through the linkages 53 to their respective shotpins 46. This is accomplished with significant mechanical advantage since the distance between the lever far end 57 and the pivot point 50 is significantly greater than between the pivot point 50 and the two pin connecting points 51. It is preferred that the ratio between these distances be at least 4 to 1.

Translational motion is applied to the far end 57 of the lever 49 through the spring 58 and the chain 59, which are both connected near the far end 57 of the lever 49 on opposite sides of the lever 49. The spring 58 is connected at one end to the stud 60 on the lever 49, and at its other end to a bolt or screw 61 in the backplate 21 near the bottom of the left side plate 22 so that the spring 58 biases the lever 49 toward its locking position and the shotpins 46 in turn are biased to move to intersect the vertical planes of the sector plates 22. The chain 59, or other tensile force translation member, is connected near the lever far end 57 by means of an eye screw 62. When the chain 59 is pulled, the lever 49 rotates so that the shot pins 46 are withdrawn inwardly away from the sector plates 26, thereby releasing the sector assembly 14 for rotation to its release position.

However, located on each of the two shotpin housings 47 is a V-spring 64 which, as shown in FIG. 4 by dashed lines, acts to temporarily restrain the sector assembly 14 from immediately rotating fully to its release position. Without the V-springs 64, the sector assembly 14 under the force of gravity normally would rotate to its release position when the shotpins 46 are released by pulling the chain 59. This, however, has been found to be undesirable. Thus, when the shotpins 46 are released, the sector assembly 14 begins its rotation in the second rotational direction toward its release position, but is stopped quickly by the abutment of the crossbar 30 against the two V-springs 64. The sector assembly 14 rotates fully to its release position when the vehicle drives forwardly away from the vehicle restraint 10, thereby causing its ICC bar to push against the restraint surfaces 19, overcoming the force of the V-springs 64.

Figure 7:
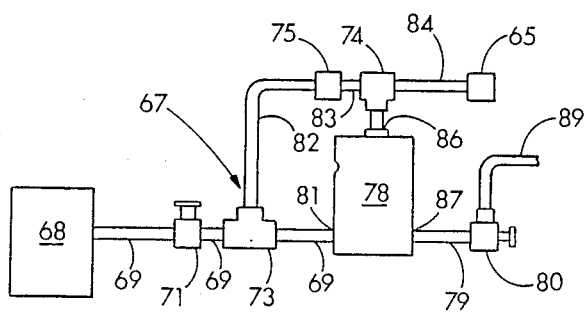
FIG. 7 is a schematic diagram of the pneumatic circuit control system which can be used with the vehicle restraint.

The pneumatic control system 67 shown in FIG. 7 may be identical to the pneumatic circuit disclosed in U.S. Pat. No. 3,244,415 to Lunenschloss, et al., the disclosure of which is hereby incorporated herein. The preferred pneumatic control system 67 includes a source 68 of pressurized fluid such as compressed air, a main fluid line 69, a normally open regulator valve 71 or other similar means to control the flow of fluid in the line 69, T-connectors or joints 73 and 74, an energizing valve 75, a bleed valve 65, a combination pressure-bleed piloted control valve 78, an outlet line 79, and a variable check valve 80. The arms of the first T-joint 73 are in the main fluid line 69 which is connected to the inlet 81 of the control valve 78. A branch line 82 connects the leg of the first T-joint 73 with the energizing valve 75. The energizing valve 75 is connected by a line 83 to one arm of the second T-joint 74. The other arm of the second T-joint 74 is connected by a line 84 to the bleed valve 65. The leg of the second T-joint 74 is connected to the pilot inlet 86 of the control valve 78 for operation of the control valve 78. The outlet line 79 extends from the outlet 87 of the control valve to the variable check valve 80. The variable check valve 80 is of conventional known construction and is adapted to permit unrestricted flow in one direction, but to selectively restrict the flow of fluid in the other direction. The variable check valve 80 is connected by the actuator line 89 to the actuator 15, which in this case is a single-action pneumatic cylinder. The variable check valve 80 permits the free flow of fluid into the actuator 15, but allows the actuator to exhaust at a selected rate. The bleed valve 65 which is shown schematically in FIG. 7 is also shown in FIGS. 5 and 6, and acts as a switch means for stopping operation of the actuator 15 when the sector assembly 14 reaches its restraint position and the lever 49 reaches its locking position. A block 90 is mounted on the backplate 21 near the bleed valve 65 to prevent the lever 49 from damaging the bleed valve 65 when the lever 49 moves to its locking position shown in FIG. 6. Alternatively, the electrically operated pneumatic control system disclosed in U.S. Pat. No. 3,291,003 to Lunenschloss, et al., the disclosure of which is hereby incorporated herein, could be used instead of the pneumatic circuit of U.S. Pat. No. 3,244,415.

Preferably the vehicle restraint 10 also includes a limit switch 91 which is shown in FIGS. 1 and 2. The limit switch 91 includes a fairly stiff resilient wand 93 which extends upwardly laterally forward of the location of the confining area 18. The wand 93 is connected to a pivot 94, which when turned completes a circuit to illuminate an indicator such as a light (not shown). Extending downwardly from the pivot 94 is a thin rod 95 which in turn is connected to the return spring 96 which is mounted to the right side plate 22 by a bolt or screw as shown at 97.

As a truck or other vehicle backs toward the vehicle restraint 10 and the ICC bar 17 moves rearwardly into position within the confining area 18, the ICC bar 17 pushes the wand 93 rearwardly to rotate the pivot 94 and thereby illuminate the indicator light. The individual operating the vehicle restraint 10 then becomes aware that the ICC bar 17 is positioned correctly in the confining area 18, and that the control system 67 may then be operated to rotate the sector assembly 14 to its restraint position. As shown in FIG. 2, when the wand 93 is pushed rearwardly and the pivot 94 turned, the thin rod 95 moves forwardly extending the return spring 96. When the ICC bar 17 is released and the vehicle is moved forwardly, the return spring 96 returns the pivot 94, wand 93, and thin rod 95 to their original positions shown in FIG. 1. Although the limit switch discussed herein only operates an indicator, alternatively the limit switch 91 could be used to energize the energizing valve 75 and thereby automatically rotate the sector assembly 14 to its restraint position when the ICC bar 17 is in proper position.

Operation of the vehicle restraint 10 is best demonstrated in FIGS. 1–2, and 5–6. The sector assembly 14 is initially in its release position as shown in FIG. 1. As a vehicle moves rearwardly, its ICC bar 17 moves into the confining area 18 and activates the limit switch 91. The indicator light connected to the limit switch 91 then indicates that the ICC bar 17 is in proper position for restraint thereof. Then the individual operating the control system can begin operation of the actuator 15 by momentarily opening the energizing valve 75. Opening the energizing valve 75 allows a rush of compressed air to enter the control valve 78 through the pilot inlet 86, thereby energizing the control valve 78 to allow compressed air to flow from the inlet 81 of the control valve 78 to its outlet 87. The energizing valve 75 may then be closed. The lines 83 and 84 will remain pressurized thereby keeping the control valve 78 open until the bleed valve 65 is opened by the lever 49. While the control valve 78 is open, pressurized air flows through the variable check valve 80 into the actuator 15 causing the whole sector assembly 14 to rotate in the first rotational direction to the restraint position shown in FIG. 2. The locking surfaces 39 on the sector plates 26 rotate to a position below the shotpins 46, thereby allowing the spring 58 to rotate the lever 49. This causes the shotpins 46 to be extended over the locking surfaces 39 as shown in FIG. 6, thereby locking the sector assembly 14 in its restraint position so that the ICC bar 17 is held. As the sector assembly rotates to the restraint position the crossbar 30 deflects the free ends of the V-springs 64 to permit passage of the crossbar 30 to the position beneath the V-springs 64 shown in FIG. 4. At the same time, the lever 49 reaches its locking position and presses against the bleed valve 65 as shown in FIG. 6. The bleed valve 65 is opened, releasing the air from the lines 83 and 84 and allowing the control valve 78 to close so that air is no longer driven into the actuator 15 to operate the same. The block 90 prevents the lever 49 from rotating so far as to damage the bleed valve 65.

Eventually the individual operating the control system will want to release the vehicle from the dock. This may be accomplished by simply pulling the chain 59 so that the lever 49 rotates to its releasing position, thereby pulling the shotpins 46 away from the locking surfaces 39 of the sector plates 26. Once this is done, the sector assembly 14 is free to rotate partially in its second rotational direction toward the release position. However, before the sector assembly 14 rotates entirely into the release position, the crossbar 30 strikes the V-springs and stops rotating. As shown in dashed lines in FIG. 4, the V-springs 64 allow sufficient rotation of the sector assembly 14 so that the shotpins 46 will no longer move outwardly to overlie the locking surfaces of the sector plates 26. The shotpins 46 are restrained from moving outwardly by the sector plates 26. The V-springs 64 prevent the sector assembly 14 from dropping fully to the release position immediately when the chain 59 is pulled. The sector assembly 14 will rotate to its release position as the truck or other vehicle drives forwardly, thereby causing the ICC bar 17 to push against the restraint surfaces 19 of the sector plates 26 causing the sector assembly 14 to rotate. Once the ICC bar 17 is entirely cleared from the confining area 18, the indicator light which is energized by the limit switch 91, shuts off.

The ICC bars 17 of 95% of the trucks in current use are positioned between 15 and 30 inches above the ground. A preferred vehicle restraint 10 with restraint surfaces 19 located between 15 and 30 inches above the ground when the sector assembly 14 is in its restraint position, therefore will be able to restrain the movement of 95% of all trucks. If the restraint surfaces 19 are long enough to extend from 12 to 30 inches above the ground when in the restraint position, almost all trucks and trailers could be captured by the vehicle restraint 10 without readjustment of its height. The vehicle restraint 10 therefore is able to restrain vehicles having ICC bars which are quite varied in their elevation above the ground. This is accomplished without any significant adjustments of the vehicle restraint 10.

ICC bars are designed to fail at 14,000 pounds of force. The vehicle restraint 10 tested was found to be capable of withstanding at least 32,000 pounds. Alternatively, the shotpins 46 could be made smaller to allow their shearing when sufficient force is encountered, so that the vehicle is released without damaging the ICC bar 17. The restraint sector portions 36 and the locking sector portions 37 of the sector assembly are quite thick in the directions in which forces are to be resisted. The forces which act on the sector plates 26 are substantially in the planes of sector plates 26. It therefore is very unlikely that the restraint or locking sector portions 36 or 37 will become sheared or otherwise damaged.

It is to be understood that the present invention is not limited to the particular arrangement and embodiments of parts disclosed and illustrated herein, nor to the material specified, but embraces all such modified forms thereof as come within the scope of the following claims.

What is claimed is:

1. A vehicle restraint for releasably locking a vehicle to an adjacent structure, comprising:
   (a) a frame which can be mounted adjacent to the structure;
   (b) a sector assembly which is mounted within the frame to rotate about a substantially horizontal axis in a first rotational direction to a restraint position and in an opposite second rotational direction to a release position, the sector assembly including at least one sector plate which rotates in a substantially vertical plane and which includes a restraint sector, portion with a restraint surface formed by a radial-like sector margin facing in the first rotational direction, which restraint sector portion extends substantially upwardly above the frame when the sector assembly is in its restraint position to define a confining area behind the restraint surface, and allows forward access to the confining area when the sector assembly is in its release position; and a locking sector portion, with a locking surface formed by a radial-like sector margin facing in the second rotational direction;
   (c) at least one movable impediment biased to move to intersect said vertical plane, and mounted to the frame such that when the sector assembly is in its restraint position, the impediment can move to intersect the vertical plane adjacent to and slightly in the second rotational direction from the locking surface, thereby preventing rotation of the sector assembly in the second rotational direction to its release position until the impediment is moved away from the vertical plane; and
   (d) an actuator, which is connected to the frame and sector assembly to rotate the assembly in the first rotational direction into the restraint position.

2. The vehicle restraint specified in claim 1 wherein there are two parallel sector plates in the sector assembly which are rigidly interconnected by crossmembers extending therebetween.

3. The vehicle restraint specified in claim 1 wherein the sector plates are each in the form of a three quarter sector.

4. The vehicle restraint specified in claim 1 wherein the sector plates are each in the shape of a sector of an oval.

5. The vehicle restraint specified in claim 4 wherein each sector plate is substantially a three quarter sector of an oval.

6. The vehicle restraint specified in claim 1 wherein the movable impediment includes a shotpin which is horizontally slidable through a shot pin housing which is mounted to the frame.

7. The vehicle restraint specified in claim 6 further including a lever which is pivotally connected to the frame to pivot around a pivot point between a locking position and a releasing position, the lever having at least one pin connecting point which moves toward the shotpin housing in about a horizontal direction when the lever pivots toward the locking position, and which moves away from the shotpin housing in about a horizontal direction when the lever pivots toward the releasing position; and a linkage having a first end which is pivotally connected to the pin connecting point on the lever, and a second end which is pivotally connected to the shotpin, so that when the lever pivots into its locking position the shotpin slides to intersect the vertical plane adjacent to the locking surface of the sector plate, and when the lever pivots into its releasing position the shotpin slides away from the vertical plane.

8. The vertical restraint specified in claim 7 wherein the shotpin is biased to slide to intersect the vertical plane by a spring which is connected to the frame and lever near a far end of the lever to bias the lever toward its locking position.

9. The vehicle restraint specified in claim 7 further including a flexible tensile force transmission member which is connected at one end near a far end of the lever and which can be pulled to move the lever toward its releasing position.

10. The vehicle restraint specified in claim 7 further including means for stopping operation of the actuator when the lever reaches its locking position.

11. The vehicle restraint specified in claim 7, wherein the frame includes a backplate and two sideplates which each extend forwardly from the side margins of the backplate, the lever is pivotally mounted to the backplate, each shotpin housing is mounted to the backplate, and the section assembly is rotatably mounted between the sideplates on an axle parallel to the backplate.

12. The vehicle restraint specified in claim 1, wherein each sector plate includes a stop which extends outwardly from an outside surface of the sector plate, and which is positioned to engage the frame to prevent the sector assembly from rotating too far in either extreme rotational direction, thereby preventing damage to the actuator by not allowing the actuator to become too compressed or to become too extended.

* * * * *